United States Patent [19]

Taylor

[11] 4,277,152
[45] Jul. 7, 1981

[54] CONTROLS FOR SYNCHRONIZING AUDIO SIGNALS WITH FILM ADVANCEMENT IN A PROJECTOR

[75] Inventor: Stanford E. Taylor, Lloyd Harbor, N.Y.

[73] Assignee: Instructional/Communications Technology, Inc., Huntington Station, N.Y.

[21] Appl. No.: 98,758

[22] Filed: Nov. 30, 1979

[51] Int. Cl.³ .................. B03B 31/00; G03B 1/22
[52] U.S. Cl. ........................ 352/17; 352/27; 352/92; 352/169; 352/191; 353/15; 353/19
[58] Field of Search ............ 352/191, 192, 193, 194, 352/195, 196, 169, 174, 176, 27, 17, 92; 353/15, 19

[56] References Cited

U.S. PATENT DOCUMENTS

| | | | |
|---|---|---|---|
| 3,168,743 | 2/1965 | Nesson | 352/191 |
| 3,515,470 | 6/1970 | Browder | 352/236 |
| 3,591,265 | 7/1971 | Shropshire | 352/192 |
| 3,880,506 | 4/1975 | Caraway | 352/196 |
| 4,053,214 | 10/1977 | Brucat | 352/191 |

Primary Examiner—Monroe H. Hayes
Attorney, Agent, or Firm—Kane, Dalsimer, Kane, Sullivan & Kurucz

[57] ABSTRACT

A synchronized audio visual system including an audio program source capable of producing a film advance signal at predetermined intervals and a projector interconnected therewith. The projector has a source of light for passing light through an aperture in the projector and film is directed along a pathway into and out of alignment with the aperture for projection of individual frames thereof in sequence. A motor is used for initiating advance of the film in response to advance signals from the audio source in a predetermined sequence. The motor directs an advance mechanism including a rotating member with a drive projection extending therefrom for rotating into and out of engagement with film support and drive structure for the film. The period of advance of the film is controlled by each stroke of the rotating member and is related to a film advance signal from the audio source. Assisting in the limitation is the rotating member which forms a switch connected to the motor to close a circuit when in contact with the drive structure for the film and open the circuit otherwise. In this manner, the period of film advance is controlled and synchronized with the audio program source.

11 Claims, 4 Drawing Figures

CONTROLS FOR SYNCHRONIZING AUDIO SIGNALS WITH FILM ADVANCEMENT IN A PROJECTOR

BACKGROUND OF THE INVENTION

It is quite common to provide synchronized audio and visual programs for many purposes such as teaching aids, business presentations and pleasure programming. Whatever use is being made of the visual and audio programs, it is important that the visual presentation be advanced in synchronization with the audio program. Additionally, in various types of teaching devices which employ scanning mechanisms in cooperation with advancing film strips and the like and coordinated audio programs, it is important that all of the related elements be synchronized so that the movement of the film, the audio presentation and the scanning by the light means is coordinated and synchronized under controlled conditions. Naturally in addition to film strips for visual presentation, other perforated materials can be used for a variety of purposes and can be coordinated with audio or other means in a synchronized fashion.

Example of a synchronized audio visual system of the type under consideration is present in U.S. Pat. No. 4,053,214. The contents of that patent are incorporated herein by reference.

In conventional types of known systems such as present in the above referenced patent, the cue signal from the audio tape is detected and activates a relay or other switching device. The closure of the relay contacts connects voltage by a cable to the projector motor circuit which in turn advances the film. In common use, the lead time before film advance for this voltage to reach the motor is approximately ½ second. Because the cue signal time is not precise and due to other variables such as mechanical resistance, over travel, and the like which are present, the film advance cannot be equal, nor synchronized. Accordingly, a referenced limit means is necessary on the projector film advance mechanism. Normally this is accomplished by a cam and micro switch or photo cell. This results in a somewhat complex system including a number of additional component parts and wiring requirements. Naturally, assembly and disassembly then takes a greater length of time. It is contemplated that a simpler and equally if not more effective system can be deviced for insuring the synchronization of an audio program, such as that presented on a cassette tape, with a visual projector, such as the teaching film strip projector depicted and described in the above referenced patent.

SUMMARY OF THE INVENTION

With the above background in mind, it is a primary objective of the present invention to provide an improved audio visual system with unique control for synchronizing the audio signals with the film advancement in a projector for visual presentation from a film strip and the like. It is contemplated that a common existing projector system can be adapted to include a synchronization jack which opens the motor circuit when a plug is inserted. This is part of the existing projector structure without the necessity of further components and more complex wiring. It is proposed that a rotating member which includes a helix for scanning purposes such as in the above referenced patent can be used as a switch. It is common to provide this rotating member with the helical aperture with nyliner bearings so that it is electrically isolated from ground. Also, in the projector of the above referenced type the motor is ungrounded due to the presence of rubber shock mounts. Consequently, it is contemplated that one wire can be connected to ground from the advance mechanism and another from the rotating member with the helical opening to the motor. In this manner a closed circuit is provided when the rotating member strokes the film advance spring. In between this period, the motor circuit is open except when the audio cue signal is detected, relay is closed and motor is pulsed to rotate helix paddle onto the film advance spring. Further finer synchronized adjustment can be achieved by the use of a conventionally known speed knob by which the best voltage to the motor is selected.

In summary, a synchronized audio visual system is provided including an audio program source capable of producing a film advance signal at predetermined intervals and a projector. The projector has a source of light for passing light through an aperture in the projector and means for directing film along a pathway into and out of alignment with the aperture for projection of individual frames thereof in sequence. Drive means is provided on the projector for initiating advance of the film in response to advance signals from the audio source in a predetermined sequence. Advance means responsive to the drive means is provided to advance the film and the advance means includes a rotating member with a drive projection extending therefrom for rotating into and out of engagement with film support and drive structure for the film. Limit means for controlling the time period of advance of film as a function of each stroke of the rotating member and in relationship of this to a film advance signal from the audio source is provided. The limit means includes the rotating member forming a switch connected to the drive means and closing a circuit when in contact with the drive structure for the film and opening the circuit otherwise thereby controlling the period of film advance and synchronizing the film advance with the audio program source.

With the above objectives among others in mind, reference is made to the attached drawing.

DETAILED DESCRIPTION

Figure 1:
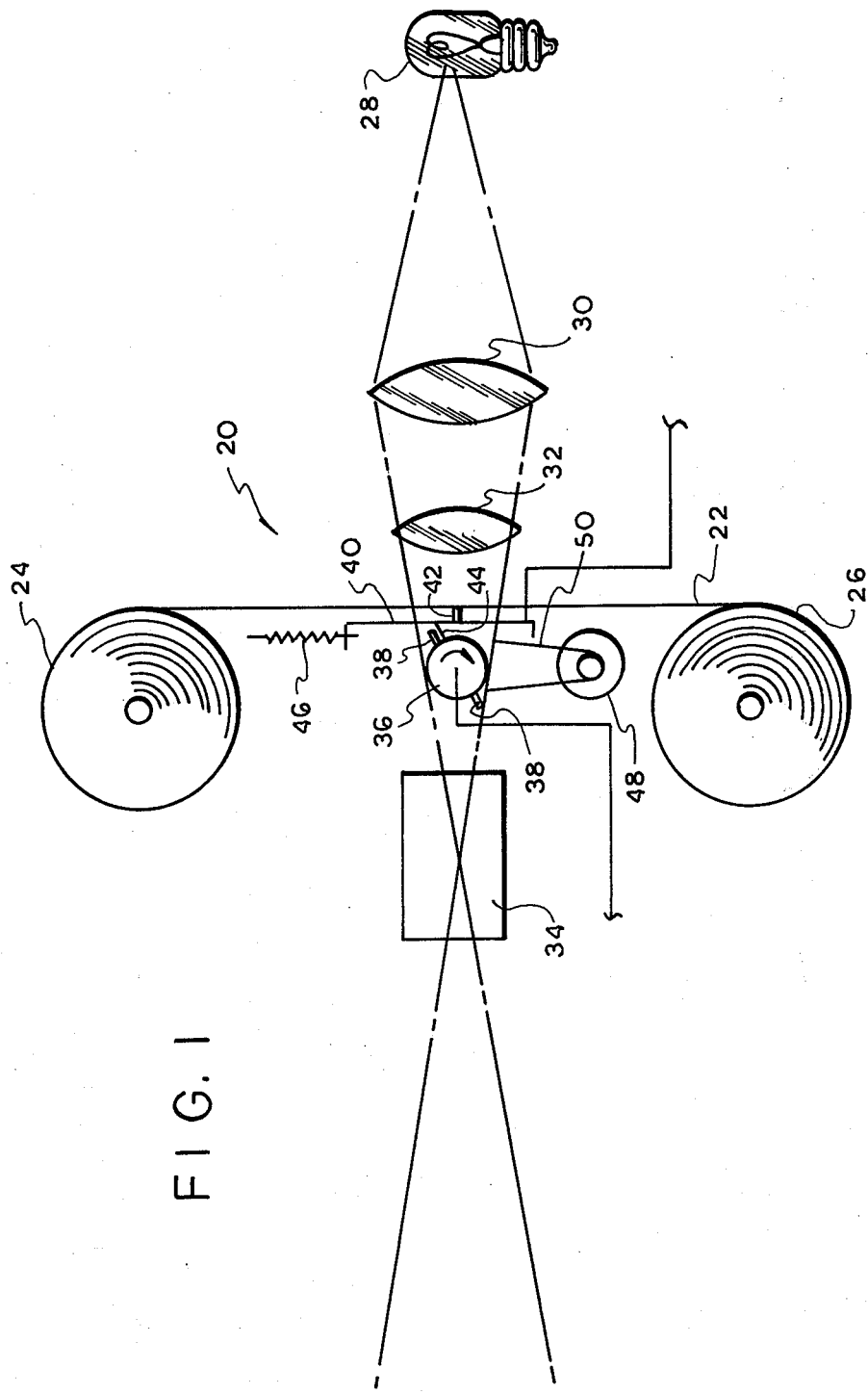
FIG. 1 is a schematic view of portions of the projector incorporating the present invention.

The projector system 20 incorporating the present invention is depicted in FIG. 1 in schematic form. A film strip 22 extends from one coil 24 to a second coil 26. A light source 28 is provided to direct light through appropriate condenser lenses 30 and 32 through the film strip 22 in alignment therewith. The resulting image is then projected from a projector lens 34 unto a projection screen for viewing purposes.

A rotating cylinder 36 having a pair of opposing projection cams 38 is provided in adjacent position to an elongated leaf spring 40. A pawl 42 for engaging the film 22 extends from one side of leaf spring 40 and an angularly extending drive projection 44 extends from the opposite side of spring 40. A helical return spring 46 is provided to return the leaf spring 40 to its initial position after stroking of the film. A motor 48 is connected to drive cylinder 36 in any conventional manner such as by coupler or belt 50.

In operation, motor 48 through belt 50 rotates cylinder 36 in the direction designated by the arrow in FIG. 1 and causes the cams 38 in sequence to contact angular projection 44 on leaf spring 40 and initially deflect the spring downward. This action directs pawl 42 into engagement with a perforation in film strip 22. Cam 38 then drives projection 44 and the remainder of spring 40 with the captured film forward in the direction of motion of the rotating cylindrical member 36 until cam 38 becomes disengaged with projection 44. At that point, the resiliency of leaf spring member 40 will permit it to return to its initial configuration withdrawing pawl 42 from the perforation in the film. Thereafter, return spring 46 will compress to the relaxed position drawing spring 40 back to its initial position. Appropriate limit means are provided on both ends of spring 40 to restrict movement thereof in the longitudinal direction. In this manner, the perforated film is advanced a predetermined distance. Further advancement is accomplished by repetitive steps in the same manner.

Figure 2:
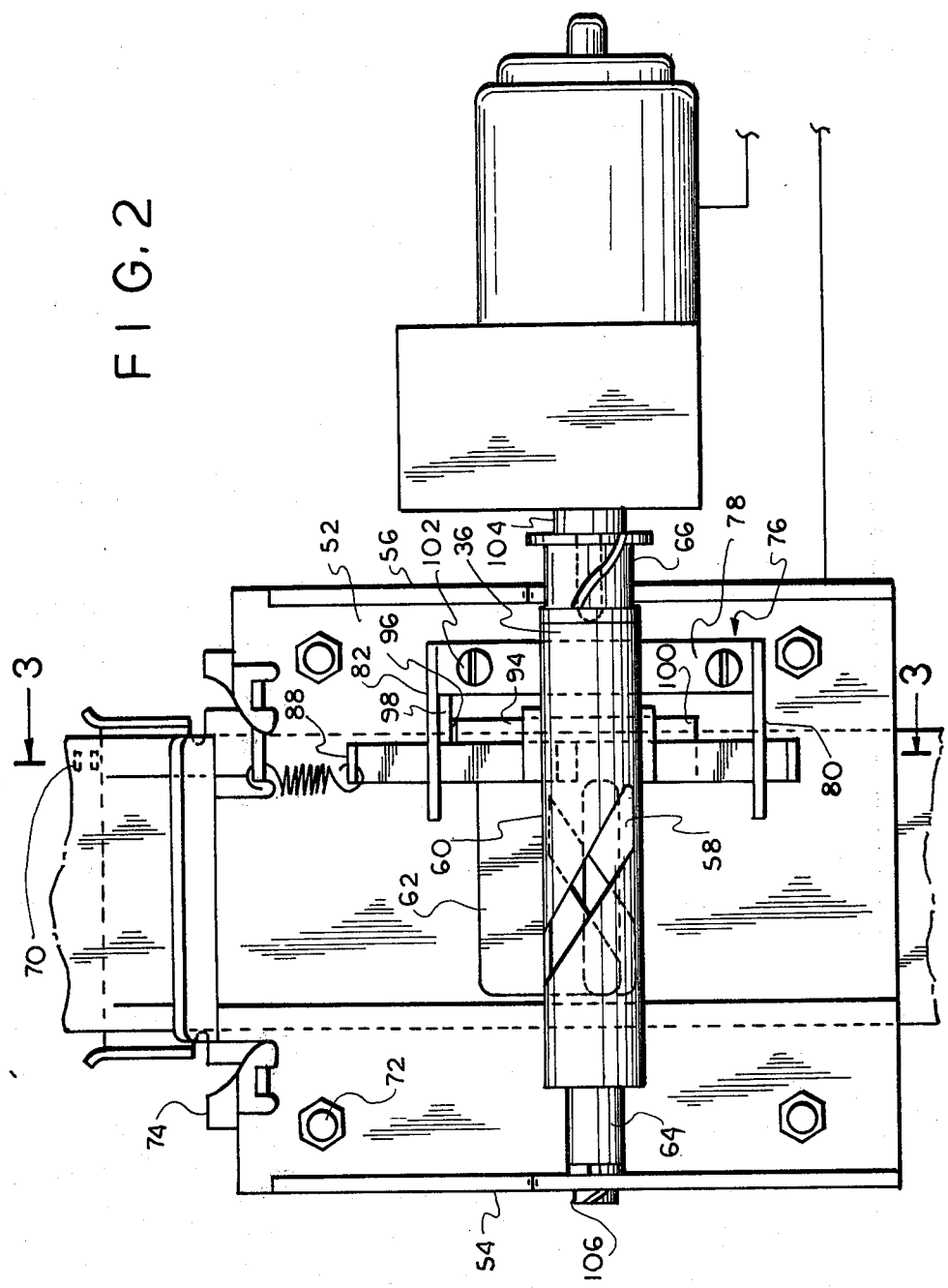
FIG. 2 is a front plan view of a fragmentary portion of the projector incorporating the invention and showing a portion of a film strip passing therethrough.
Figure 3:
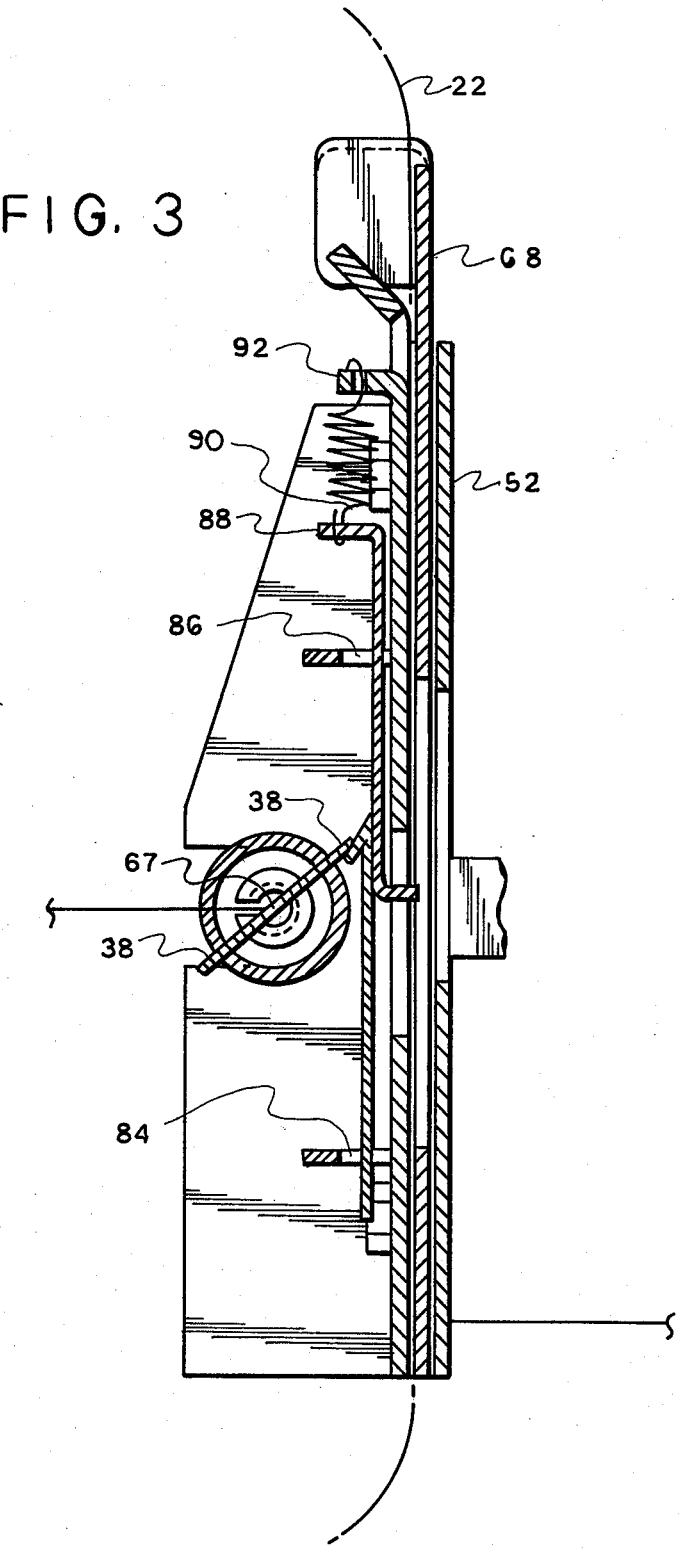
FIG. 3 is a sectional elevation view thereof taken along the plane of line 3—3 of FIG. 2.

Specific structural details on the mechanical advancement portion of the projector are depicted in FIGS. 2 and 3.

The projector depicted is similar to that shown in the above referenced U.S. Pat. No. 4,053,214. Specifically in connection with the advancement of the film 22, a sheet metal rectangular base 52 is provided with a pair of opposing side walls 54 and 56. A rotatable cylindrical member 36 is mounted on a pair of opposing openings in the side walls 54 and 56 so as to permit rotation of member 36. Cylindrical member 36 has a pair of opposed helical openings 58 and 60 along its length which are designed to cooperate with light source 28 in blocking and permitting passage of light to a central aperture 62 in the support base 52 in order to advance the light beam from left to right across aperture 62. Cylindrical member 36 has one smaller end 64 mounted in a receiving opening in wall 54 and has its larger opposite end 66 positioned in an appropriate receiving slot in the other side wall 56. Intermediate the ends of member 36 are the pair of opposed laterally extending cams 38 which are positioned to drive the pawl mechanism as discussed above for advancing the film. These cams 38 extend from the exterior surface of member 36 and interconnect through a cross bar 67 extending diametrically across the interior of cylindrical member 36 which is hollow. This cross bar provides for ease of engagement with the coupling for the drive motor 48.

A guideway is formed by a slidable bottom plate 68 coupled with the underside of base plate 52 at a location containing a recessed central portion so as to form a pathway along base 40 for directing film strip 22 into and out of alignment with aperture 62 which in turn is aligned with the guideway formed by plate 68 and base 52. The film has a plurality of sprocket holes 70 along one edge which are positioned to be brought into alignment with an appropriate slot adjacent to aperture 62 and formed by combined aligned slots in the plate 68 and base 52. Appropriate fasteners such as screws and nuts 72 are used to maintain the components in fastened relationship.

Appropriate spacers 74 are employed to assure proper alignment for the pathway provided by the mated plates for purposes of advancement of film 22.

The pawl mechanism includes a saddle bracket 76 with an elongated central base portion 78 terminating in a pair of opposed end walls 80 and 82. The end walls are upright in configuration, extend laterally from the base portion 78 and include aligned notches 84 and 86 for receipt therethrough of the elongated leaf spring member 40. The leaf spring member 40 is of resilient material such as spring steel to provide the necessary resilience for operation of the pawl mechanism. One end of the leaf spring member 40 includes an upstanding tab 88 with a notch or opening 90 therein. One end of helical spring 46 is attached to tab 88 through opening 90 and the other end of spring 46 is attached to an upstanding tab 92 on base 52 which also has a receiving orifice therein.

In this manner the longitudinal axis of helical spring 46 is substantially aligned with the longitudinal axis of the leaf spring member 40 as depicted in FIGS. 2 and 3. Extending laterally from leaf spring member 40 is a stop portion 94 which is shorter in length than the remainder of spring 40 and is spaced from both ends thereof. One end of stop portion 94 terminates in an upstanding tab 96 which is positioned for engagement with a receiving pad 98 on end wall 82 of the bracket. A large contact area provided between the broad tab 96 and the receiving pad 98 facilitates the production of a positive stopping interengagement and reduces the danger of wear of parts since the stopping force is distributed over a large area.

When leaf spring member 40 is extended through openings 84 and 86 in the walls of the saddle bracket, the stop portion 94 will engage with end wall 82 as just described to limit axial movement in one direction and the other end of stop portion 94 is provided with an upstanding tab 100 opposed to tab 96 for engagement with the wall 80 to limit axial movement in the other direction. Thus the axial travel of the pawl mechanism is determined. If desired, a pad similar to pad 98 can be provided on the support to engage with tab 100.

On one side of leaf spring member 40 is downwardly extending pawl 42 which is designed for interengagement with the sprocket holes 70 in film 22. Since leaf spring member 40 is flexible it can flex to disengage pawl 42 from film perforation 70 to prevent damage to the film such as when the film is manually pulled or when the perforation is not vertically aligned to receive the pawl. Somewhat aligned with pawl 42 on the opposite side of spring 40 is an angularly extending upward projection 44 which forms a flexible shoulder for engagement with cams 38 of rotating cylindrical member 36.

In general, the elongated leaf spring member 40 is positioned in slots 84 and 86 of saddle bracket 76 and saddle bracket 76 is mounted to base 52 at the appropriate point by means of conventional fasteners such as screw and nut assemblies 102. The elongated spring member 40 is then in position to be attached at one end to helical spring 46 which is mounted to tab 92 on base 52. Limit tabs 96 and 100 are in position for limiting axial movement of spring 40 with respect to the slot and end walls 80 and 82. Pawl 42 is positioned for insertion into sprocket holes 70 of film 22.

Cylindrical member 36 is positioned in the appropriate receiving slots in side walls 54 and 56 which puts cams 38 in alignment for interengagement with upwardly extending drive projection 44. The mechanism is then inserted into an appropriate projector with aperture 62 and the helical openings 58 and 60 in the member 36 aligned with the source of light 28. Drive motor assembly 48 is coupled with the end of member 36 by interconnection between the drive shaft of the motor and the cylindrical member 36.

Figure 4:
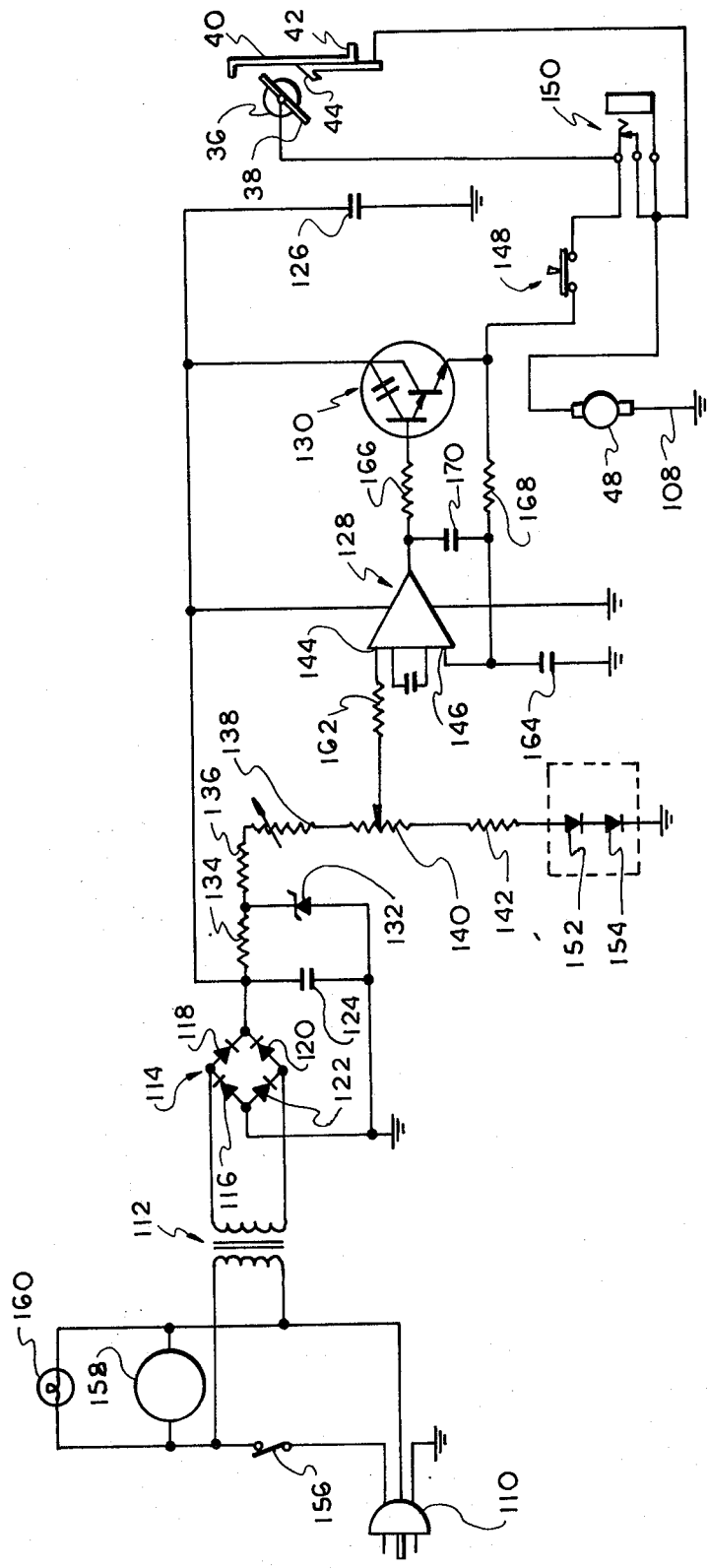
FIG. 4 is a schematic view of the electrical circuitry of the audio visual system incorporating the controls of the invention.

Appropriate electrical interconnection between the interrelated elements discussed above and in combination with a conventional audio system such as a cassette player (not shown) is depicted in schematic form in FIG. 4. Rotating cylindrical member 36 forms a switch to synchronize the sound from a cassette tape with the visual program on the projector. Conventionally, the cue signal is detected and activates a relay. The closure of the relay contacts is carried via a cable to the projector jack, where the circuit connects voltage to the motor which in turn advances the film. In order to synchronize the audio with the corresponding visual line of print, it has been found that the cue signal must lead the film drive activation by 0.5 seconds. Because the cue signal time is not precise and other variables such as mechanical resistance, overtravel, etc. are present, the film advance cannot be equal. Accordingly, rotating member 36 operates as a limit switch. Member 36 has insulated bearings 104 and 106 at both ends respectively, made of a conventional insulating material such as nylon. In this manner, the member 36 is electrically isolated from ground. Motor 48 is also ungrounded in a convenient manner such as by the use of rubber shock mountings 108. Therefore, by connecting one wire to ground and another to motor 48, a closed circuit is produced when cam 38 of cylindrical member 36 strokes the projection 44 of spring 40. When cam 38 is out of contact with projection 44, the circuit is open. In this manner, synchronization is achieved between the audio program on the cassette tape and the visual program from the projector. Additional fine trimming for synchronization purposes can be achieved by the use of a conventional existing speed knob (not shown) on the projector which varies the voltage to the motor.

Several advantages are readily apparent by this switching system, for example, less parts and labor is required. No additional micro switch, cam, and wires from the film channel to the motor box are needed. Easier assembly and disassembly can be achieved and the overall structure is much simpler and accordingly more reliable.

The circuitry for the system is shown in schematic form in FIG. 4. The input AC line voltage 110 is stepped down to 24 Vac through transformer 112. This 24 V is then applied to a full wave bridge 114 consisting of diodes 116, 118, 120, and 122, then filtered by capacitor 124 and capacitor 126 resulting in a 20 volt DC unregulated signal which serves as the primary supply voltage for operational amplifier 128, and motor drive transistor 130.

Diode 132, a zener diode, regulates the 20 Vdc supply through resistor 134 at a 16 volt level. This regulated 16 Vdc is then applied to resistors 136, 138, 140, and 142, a resistor divider, forming the basic reference voltage for the motor.

The motor reference voltage is applied to pin 144 of amplifier 128. Since there exists a feed back loop around transistor 130 and amplifier 128, the voltage at the emitter of transistor 130, which is the applied motor voltage, is forced to equal the voltage at pin 146 of amplifier 128, which in turn is equal to the reference voltage at pin 144. Therefore, varying potentiometer 140 will vary the voltage applied to the motor causing a controlled variation in speed.

The switch 148 and jack 150 are both normally closed. When switch 148 is depressed or a pin is inserted into the jack, the motor is disconnected from the driving transistor causing it to stop. Diodes 152 and 154 serve as temperature compensation for the motor.

Also shown in the circuit of FIG. 4, the line voltage 110 is directed through a power switch 156 to a fan motor 158 and a lamp 160. Resistor 162 is connected to pin 144 of amplifier 128. A capacitor 164 is connected to pin 146 of amplifier 128. Located between transistor 130 and amplifier 128 is an arrangement of resistors 166 and 168 along with capacitor 170. Thus, the schematic circuit of FIG. 4 is representative of an operative circuit for the present invention.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. In a synchronized audio visual system including an audio program source capable of producing a film advance signal at predetermined intervals, a projector having a source of light for passing light through an aperture in the projector and means for directing film along a pathway into and out of alignment with the aperture for projection of individual frames in sequence, drive means for initiating advance of the film in response to advance signals from the audio source in a predetermined sequence, advance means responsive to the drive means to advance the film, the advance means including a rotating member with a drive projection extending therefrom for rotation into and out of engagement with film support and drive structure for the film, the improvement comprising; limit means for controlling the time period of advancement of film as a function of each stroke of the rotating member and in relationship of this to a film advance signal from the audio source, the limit means including the rotating member forming a switch connected to the drive means and closing a circuit when in contact with the drive structure for the film and opening the circuit otherwise thereby controlling the period of film advance and synchronizing the film advance with the audio program source, the drive means including a motor, the rotating member and the drive structure being electrically isolated from ground, the rotating member being connected to the motor and the drive structure being grounded thereby providing a closed circuit when the rotating member contacts the drive structure and opening the circuit when the rotating member is out of contact with the drive structure, the length of time when the circuit is closed depending upon the relative positioning of the rotating member and the drive structure and the length of time the rotating member is in contact with the drive structure, the drive structure for the film including a pawl mechanism including spring means adjacent the aperture and normally in a retracted position in alignment with a slot adjacent to the aperture, the rotating member in position to bias the spring to direct the pawl mechanism through the slot into engagement with a perforation in the film and then along the slot a predetermined distance to advance the film and then release the pawl mechanism permitting the spring to return the pawl to the retracted position out of the slot, the pawl mechanism including an elongated leaf with the pawl extending downwardly therefrom intermediate its ends, a drive projection extending from the side of the elongated leaf spring opposite to the pawl in position to be engaged by the rotating member, the elongated leaf spring being slidably positioned so that engagement of the rotating member with the drive projection and application of a force thereto will bias the leaf spring until the pawl extends through the slot into engagement with a perforation in the film and then the leaf spring will be slidably moved by the rotating member and the film accordingly advanced and when the rotating member disengages from the leaf spring the leaf spring will return to its initial configuration with the pawl disengaged from the film and withdrawn through the slot whereupon return means can return the leaf spring to the normal retracted position.

2. The invention in accordance with claim 1 wherein further fine synchronization adjustment is achieved by a speed control arrangement on the projector electrically connected to the motor.

3. The invention in accordance with claim 1 wherein the drive projection is resilient and capable of acting as a spring independent on the remainder of the leaf spring to facilitate continued movement of the rotating member to facilitate disengagement therebetween and to cooperate in permitting the leaf spring to flex and disengage the pawl from the film and thereby prevent damage to the film when the film is manually pulled or when a perforation is not properly aligned with the pawl.

4. The invention in accordance with claim 3 wherein restriction means is positioned on the projector and on the pawl mechanism to restrict the distance of movement of the pawl mechanism along the length of the slot.

5. The invention in accordance with claim 3 wherein the drive projection on the elongated leaf spring is an upwardly extending prong which extends in the direction of movement of the elongated member when subjected to a force from the rotating member.

6. The invention in accordance with claim 3 wherein the return means is a helical spring attached to one end of the elongated leaf spring and to the projector, the helical spring being relaxed when the leaf spring is in the normal position with the pawl in the normal retracted position whereupon sliding of the elongated member to advance the film biases the helical spring so that when the leaf spring is released the helical spring will return to the normal relaxed position and slide the leaf spring back to the initial position.

7. The invention in accordance with claim 1 wherein the rotating member is a cylinder rotatably mounted on the projector and including at least one helical aperture therein in alignment with the aperture in the support and in position for location between a light source and the aperture, at least one drive cam extending from the outer cylindrical surface of the rotating cylindrical member and in alignment with a drive projection on the adjacent surface of the drive structure, whereupon rotation of the cylindrical rotating member brings the cam into engagement with the drive structure and initially deflects the drive structure downward to engage with the film and then continued rotation of the cylindrical rotating member slides the drive structure to advance the film until continued rotation of the cylindrical rotating member brings the drive cam out of engagement with the drive structure.

8. The invention in accordance with claim 7 wherein the position of the helical apertures are arranged with respect to the projecting cams on the cylindrical rotating member so that as the cam drives the drive structure and advances the film, the helical opening will permit passage of light through the cylindrical rotating member and through the aperture in the support thereby scanning the film from left to right with light from the light source in a simultaneous manner.

9. In a synchronized audio visual system including an audio program source capable of producing a film advance signal at predetermined intervals, a projector having a source of light for passing light through an aperture in the projector and means for directing film along a pathway into and out of alignment with the aperture for projection of individual frames in sequence, drive means for initiating advance of the film in response to advance signals from the audio source in a predetermined sequence, advance means responsive to the drive means to advance the film, the advance means including a rotating member with a drive projection extending therefrom for rotation into and out of engagement with film support and drive structure for the film, the improvement comprising; limit means for controlling the time period of advance of film as a function of each stroke of the rotating member and in relationship of this to a film advance signal from the audio source, the limit means including the rotating member forming a switch connected to the drive means and closing a circuit when in contact with the drive structure for the film and opening the circuit otherwise thereby controlling the period of film advance and synchronizing the film advance with the audio program source, the drive means including a motor, the rotating member and the drive structure being electrically isolated from ground, the rotating member being connected to the motor and the drive structure being grounded thereby providing a closed circuit when the rotating member contacts the drive structure and opening the circuit when the rotating member is out of contact with the drive structure, the length of time the circuit is closed depends upon the relative positioning of the rotating member and the drive structure and the length of time the rotating member is in contact with the drive structure, the rotating member including at least one helical aperture therein in alignment with the aperture in the support and in position for location between a light source and the aperture, at least one drive cam extending from the outer surface of the rotating member and in alignment with a drive projection on the adjacent surface of the drive structure, whereupon rotation of the cylindrical rotating member brings the cam into engagement with the drive structure and initially deflects the drive structure downward to engage with a film and then continued rotation of the rotating member slides the drive structure to advance the film until continued rotation of the cylindrical rotating member brings the drive cam out of engagement with the drive structure.

10. The invention in accordance with claim 9 wherein the rotating member is cylindrical and the position of the helical apertures are arranged with respect to the projecting cams on the cylindrical rotating member so that as the cam drives the drive structure and advances the film, the helical opening will permit passage of light through the cylindrical rotating member and through the aperture in the support thereby scanning the film from left to right with light from the light source in a simultaneous manner.

11. The invention in accordance with claim 9 wherein further fine synchronization adjustment is achieved by a speed control arrangement on the projector electrically connected to the motor.

* * * * *